W. H. ALBERT.
PACKAGE.
APPLICATION FILED JUNE 28, 1916. RENEWED AUG. 29, 1918.

1,286,486.

Patented Dec. 3, 1918.

WITNESSES

INVENTOR
Walter H. Albert
BY
ATTORNEYS

W. H. ALBERT.
PACKAGE.
APPLICATION FILED JUNE 28, 1916. RENEWED AUG. 29, 1918.

1,286,486.

Patented Dec. 3, 1918.
2 SHEETS—SHEET 2.

WITNESSES

INVENTOR
Walter H. Albert
BY
ATTORNEYS

UNITED STATES PATENT OFFICE.

WALTER HENRY ALBERT, OF NORTH CALDWELL, NEW JERSEY.

PACKAGE.

1,286,486.  Specification of Letters Patent.  Patented Dec. 3, 1918.

Application filed June 28, 1916, Serial No. 106,354. Renewed August 29, 1918. Serial No. 251,995.

*To all whom it may concern:*

Be it known that I, WALTER H. ALBERT, a citizen of the United States, and a resident of North Caldwell, in the county of Essex and State of New Jersey, have invented a new and Improved Package, of which the following is a full, clear, and exact description.

The object of the invention is to provide a new and improved package combining an envelop, a ticket and one or more cash vouchers contained in the envelop, the said package being more especially designed for use by street and subway railroad companies and other transportation companies or by theaters or other establishments issuing tickets, and arranged to enable the patrons or customers of said concerns to obtain a predetermined discount on each ticket bought, to enable an advertiser to reach a large number of persons at a comparatively small cost, and to make it remunerative to the issuing concern.

In order to accomplish the desired result use is made of an envelop provided with a detachable ticket and containing one or a plurality of cash value vouchers, the cash value of which is a predetermined fraction of the price of the ticket.

A practical embodiment of the invention is represented in the accompanying drawings forming a part of this specification, in which similar characters of reference indicate corresponding parts in all the views.

Figure 1:
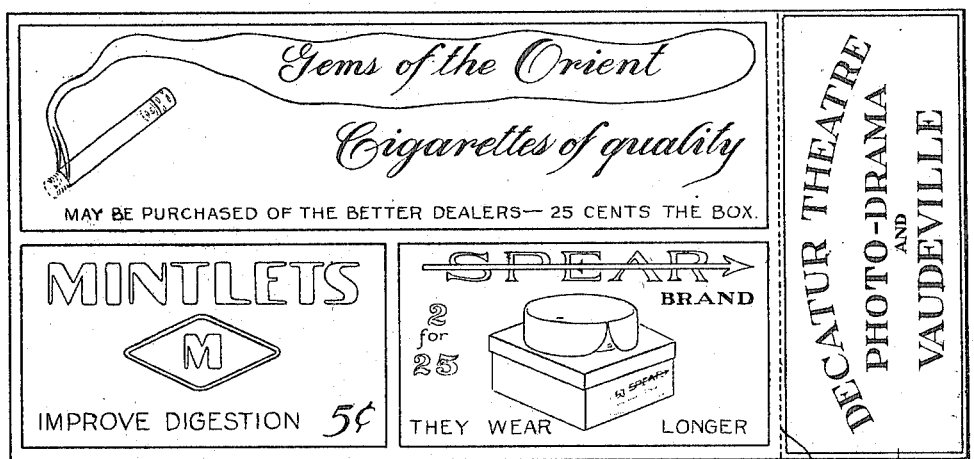
Figure 1 is a plan view of the package.
Figure 2:
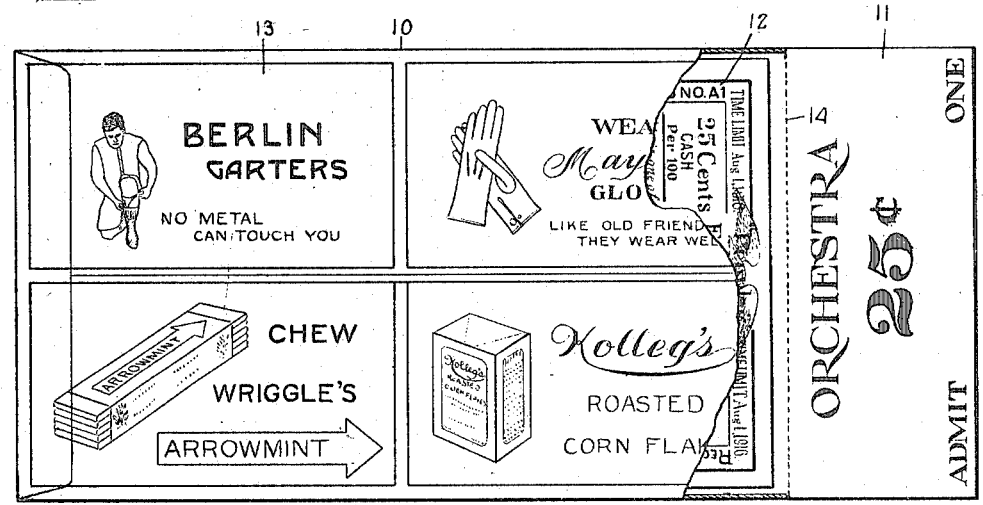
Fig. 2 is an inverted plan view of the same with part broken out to disclose the cash value voucher.
Figure 3:
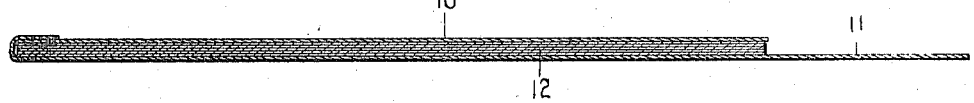
Fig. 3 is a sectional side elevation of the same.
Figure 4:
Fig. 4 is a plan view of the cash value voucher.

The package in its general construction, consists of an envelop 10 having a closing flap in the form of a ticket 11 and within the envelop is placed a cash value voucher 12 or a plurality thereof, as hereinafter more fully explained. The envelop 10 has its front and back each provided with, at least, one advertisement 13, but the space of the front and back of the envelop is preferably divided into individual fields each containing an advertisement, but the entire space may be used for a single advertisement, if desired.

The ticket 11 is an integral part of the front of the envelop 10 and a row of perforations 14 is intermediate the ticket and the envelop front to permit of conveniently tearing the ticket off the envelop at the time the ticket is to be taken up by a gatekeeper, conductor or other person employed for the purpose. The ticket 11 is provided with the price and other legends customary on tickets used in connection with theaters or railways, ferries and the like. If the price of the ticket is 5 cents then a single cash value voucher 12 is contained in the envelop 12, and if the price of the ticket is, say, 25 cents then five such cash value vouchers 12 are contained in the envelop. Each cash value voucher comprises a carrier, preferably in the form of a sheet of paper, and having produced thereon, by printing, engraving or other similar processes, a cash value voucher, preferably arranged in two portions 20 and 21 disposed at opposite ends of the carrier and with the portions spaced apart to leave a space which is divided into individual fields 22 each containing an advertisement, but the entire space may be used for a single advertisement, if desired. The voucher portions 20 and 21 contain a cash value statement in the words "25 cents cash per 100 or $2.50 cash per 1,000" together with the statement that money is held by a trust company to secure the payment of the cash stated. The cash value voucher further contains a time limit and the name of the operating concern together with the signature of the treasurer of the said concern. It also contains the number of the series and the register number of the series. The name of the certification agent together with the facsimile signature of the secretary of the said concern is also arranged on the cash value voucher. The voucher further contains the number of the series and the number of the voucher of the advertising medium of the series. The voucher may be embellished by seals, trade-marks and safeguarded from counterfeiting by water marks and the like.

It will be noticed that the cash value of a voucher is a fraction (5% on a five-cent ticket) and hence for a 5-cent ticket but one voucher is contained in the envelop, but for a 25-cent ticket five such vouchers are placed in the envelop by the issuing concern. For tickets of other prices a corresponding number of vouchers are placed in the envelop, that is, one for each five cents of the price of the ticket.

It will further be noticed that both the envelop 10 and the cash value voucher 12 are provided with advertisements and in order that the package produces the desired result, the following plan briefly stated is followed: The operating party contracts with one or more advertisers to place their advertisements on a stated number of the envelops and vouchers at a stipulated price, payable, preferably, to a trust company, which holds the money in charge to secure the payments of the cash value vouchers. The operating company next, by itself or through an authorized certification agent, issues the advertising medium in series. The packages of a series are then delivered by the agent to the railroad, theater or other concern free of charge and this concern sells the packages to the customers at the price indicated on the ticket.

From the foregoing it will be seen that a customer only pays the regular price of the ticket and obtains a cash value discount on redeeming the voucher or vouchers contained in the envelop, and hence it is to the interest of the customer to obtain the vouchers and eventually present the same to the operating company in lots, say, of 100 or 1,000 for redemption of their full face value, that is 25¢ for 100 and $2.50 for 1,000.

Having thus described my invention, I claim as new and desire to secure by Letters Patent:

1. A package, comprising an envelop, a ticket detachable on the envelop and having its price indicated thereon, and at least one cash value voucher contained in the envelop and having a cash value indicated thereon which is a predetermined fraction of the price of the ticket.

2. A package, comprising an envelop provided with at least one advertisement thereon, the envelop having a detachable closing flap in the form of a ticket, the price of which is indicated thereon, and at least one cash value voucher contained in the said envelop and having a cash value indicated thereon which is a predetermined fraction of the price of the said ticket.

3. A package, comprising an envelop provided with at least one advertisement thereon, the envelop having a detachable closing flap in the form of a ticket, the price of which is indicated thereon, and a cash value voucher contained in the said envelop and having a cash value indicated thereon which is a predetermined fraction of the price of the said ticket, the said cash value voucher also having indicated thereon at least one advertisement and a redeeming time limit.

4. A package, comprising an envelop provided with at least one advertisement thereon, a ticket detachable on the envelop and having its price indicated thereon, and a plurality of cash value vouchers contained in the said envelop, each voucher having a cash value indicated thereon, the aggregate cash values of the vouchers being a predetermined fraction of the price of the ticket.

WALTER HENRY ALBERT.

Copies of this patent may be obtained for five cents each, by addressing the "Commissioner of Patents, Washington, D. C."